US009503893B2

(12) United States Patent
Negishi et al.

(10) Patent No.: US 9,503,893 B2
(45) Date of Patent: Nov. 22, 2016

(54) COMMUNICATION MANAGEMENT SYSTEM, RELAY DEVICE, COMMUNICATION CONTROL SYSTEM, COMMUNICATION SYSTEM, COMMUNICATION METHOD, AND RECORDING MEDIUM STORING COMMUNICATION CONTROL PROGRAM

(71) Applicants: Takeshi Negishi, Saitama (JP); Takahiro Asai, Kanagawa (JP); Kenji Tanaka, Kanagawa (JP); Yoshinaga Kato, Kanagawa (JP); Katsuyuki Kaji, Tokyo (JP)

(72) Inventors: Takeshi Negishi, Saitama (JP); Takahiro Asai, Kanagawa (JP); Kenji Tanaka, Kanagawa (JP); Yoshinaga Kato, Kanagawa (JP); Katsuyuki Kaji, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 202 days.

(21) Appl. No.: 14/156,608

(22) Filed: Jan. 16, 2014

(65) Prior Publication Data

US 2014/0204833 A1    Jul. 24, 2014

(30) Foreign Application Priority Data

Jan. 18, 2013 (JP) ................................. 2013-007411
Nov. 18, 2013 (JP) ................................. 2013-237846
Jan. 10, 2014 (JP) ................................. 2014-003215

(51) Int. Cl.
*H04L 12/24* (2006.01)
*H04W 12/06* (2009.01)
*H04W 88/08* (2009.01)
*H04L 29/08* (2006.01)
*H04L 29/06* (2006.01)
*H04N 7/15* (2006.01)

(52) U.S. Cl.
CPC .......... *H04W 12/06* (2013.01); *H04L 41/0806* (2013.01); *H04L 41/0843* (2013.01); *H04L 67/34* (2013.01); *H04L 69/18* (2013.01); *H04W 88/08* (2013.01); *H04L 41/022* (2013.01); *H04N 7/15* (2013.01)

(58) Field of Classification Search
CPC ........................... H04W 12/06; H04W 88/08
See application file for complete search history.

(56) References Cited

U.S. PATENT DOCUMENTS

| 2003/0204601 | A1* | 10/2003 | Takano ................... H04L 29/06 709/227 |
|---|---|---|---|
| 2012/0069132 | A1 | 3/2012 | Kato |
| 2012/0099566 | A1 | 4/2012 | Laine et al. |
| 2013/0234893 | A1 | 9/2013 | Kusakari et al. |
| 2013/0244697 | A1 | 9/2013 | Kusakari et al. |

FOREIGN PATENT DOCUMENTS

| JP | 2009-177765 | 8/2009 |
|---|---|---|
| JP | 2012-085269 | 4/2012 |

OTHER PUBLICATIONS

Extended European Search Report issued Jul. 27, 2016 in Patent Application No. 14151414.1.

* cited by examiner

*Primary Examiner* — Jenee Williams
(74) *Attorney, Agent, or Firm* — Oblon, McClelland, Maier & Neustadt, L.L.P.

(57) ABSTRACT

A relay device is communicable with a communication management system that stores relay device identification information for identifying a relay device capable of communicating with a communication terminal using a first communications protocol, in association with configuration data that allows the communication terminal to communicate using a second communications protocol. In response to a configuration data request received from a communication terminal using the first communications protocol, the relay device transmits relay device identification information to the communication management system to obtain configuration data associated with the relay device identification information, and transmits the configuration data to the communication terminal.

19 Claims, 7 Drawing Sheets

AUTHENTICATION DATA

| TERMINAL ID | PASSWORD |
|---|---|
| 01aa | aaaa |
| 01ab | abab |
| 01ac | acac |
| ⋮ | ⋮ |

FIG. 6

CONFIGURATION DATA

| DEVICE ID | SSID | PSK |
|---|---|---|
| 001a | 100a | 200a |
| 001b | 100b | 200b |
| 001c | 100c | 200c |
| ⋮ | ⋮ | ⋮ |

COMMUNICATION MANAGEMENT SYSTEM, RELAY DEVICE, COMMUNICATION CONTROL SYSTEM, COMMUNICATION SYSTEM, COMMUNICATION METHOD, AND RECORDING MEDIUM STORING COMMUNICATION CONTROL PROGRAM

CROSS-REFERENCE TO RELATED APPLICATIONS

This patent application is based on and claims priority pursuant to 35 U.S.C. §119 to Japanese Patent Application Nos. 2013-007411 filed on Jan. 18, 2013, 2013-237846 filed on Nov. 18, 2013, and 2014-003215 filed on Jan. 10, 2014, in the Japan Patent Office, the entire disclosure of which is hereby incorporated by reference herein.

BACKGROUND

1. Technical Field

The present invention generally relates to a communication management system, a relay device, a communication control system, a communication system, a communication method, and a communication control program stored on a recording medium, each of which manages configuration data that allows a communication terminal to communicate using a predetermined communications protocol.

2. Description of the Related Art

With the need for reducing costs or times associated with business trips, videoconference systems are widely used. The videoconference systems allow transmission of contents data such as image data and/or sound data among a plurality of videoconference terminals that are remotely located from one another through a communications network such as the Internet. Further, the recent videoconference systems are made compact in size such that a user can easily carry the videoconference system in a similar manner as the user carries a notebook PC. For example, the user can bring the videoconference system in any desired room or any desired building to have videoconference. In such case, the videoconference system is connected to a wireless LAN available for that room or building to start communication.

SUMMARY

Example embodiments of the present invention include a relay device communicable with a communication management system. The relay device includes: a memory that stores relay device identification information for identifying the relay device; a transmitter that transmits the relay device identification information obtained from the memory to the communication management system using a first communications protocol, in response to a configuration data request received from a communication terminal using the first communications protocol; and a receiver that receives configuration data associated with the relay device identification information from the communication management system. The transmitter further transmits the configuration data received from the communication management system to the communication terminal as a response to the configuration data request using the first communications protocol, the configuration data allowing the communication terminal to communicate using a second communications protocol.

Example embodiments of the present invention include a communication management system. The communication management system includes: a memory that stores, for each one of more relay devices, relay device identification information for identifying a relay device capable of communicating with a communication terminal using a first communications protocol, in association with configuration data that allows the communication terminal to communicate using a second communications protocol; a receiver that receives relay device identification information for identifying a relay device, the relay device identification information being transmitted from the relay device that receives a configuration data request from a communication terminal using a first communications protocol; and a transmitter that transmits configuration data associated with the relay device identification information obtained from the memory, to the communication terminal via the relay device.

Example embodiments of the present invention include a system including the above-described relay device and the communication management system.

Example embodiments of the present invention include a communication method performed by any one of the relay device and the communication management system, and a recording medium storing a communication control program.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Figure 1:
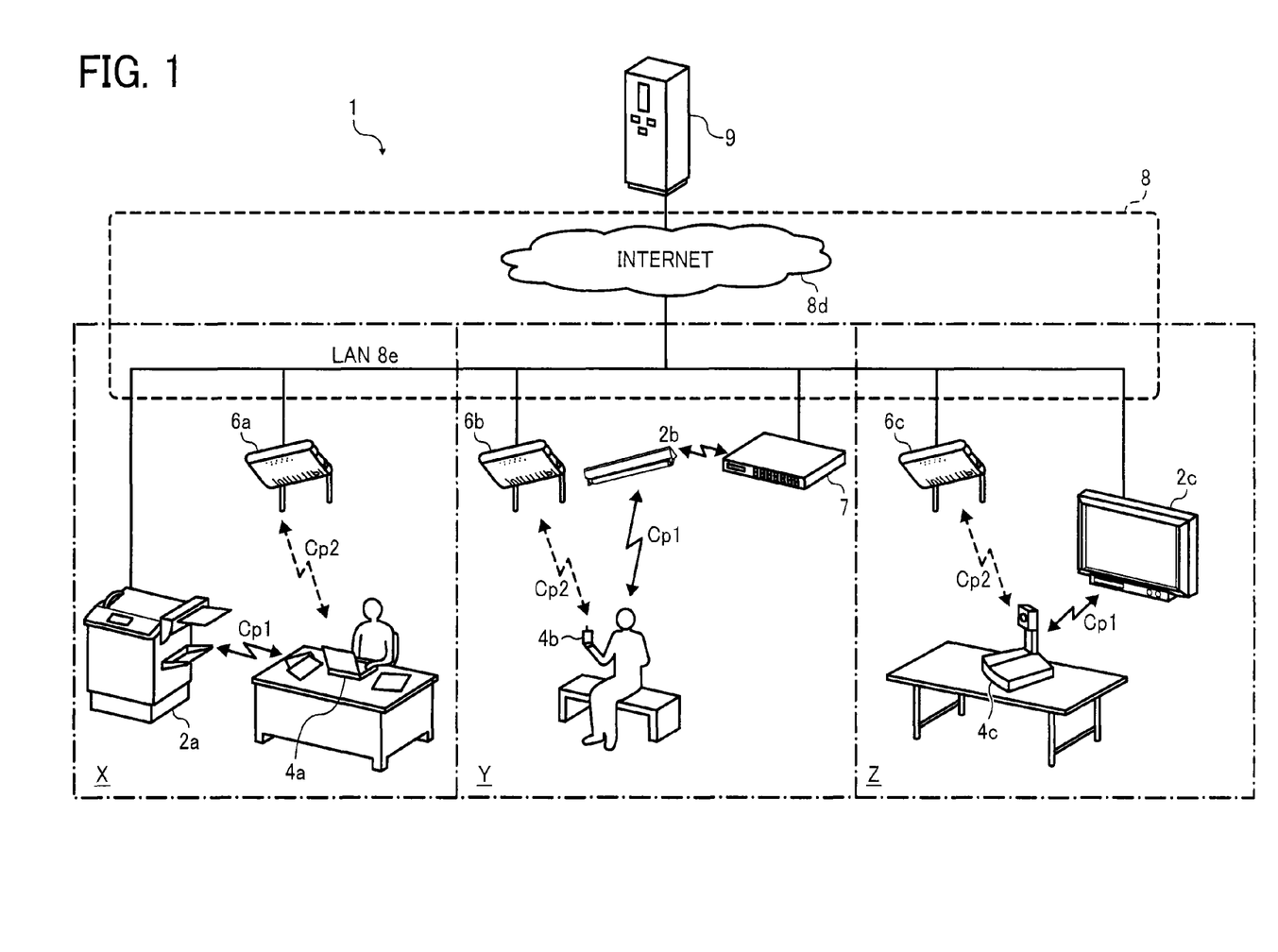
FIG. 1 is a schematic block diagram illustrating a configuration of a communication system, according to an example embodiment of the present invention.

FIG. 1 illustrates a configuration of a communication system 1 according to an example embodiment of the present invention. As illustrated in FIG. 1, the communication system 1 includes relay devices 2a, 2b, and 2c, communication terminals 4a, 4b, and 4c, access points 6a, 6b, and 6c provided on a local area network (LAN) 8e, a gateway 7, and a communication management system 9 functioning as a server. The relay devices 2a and 2c, the access points 6a, 6b, and 6c, and the gateway 7 are connected to the Internet 8d through the LAN 8e. The relay device 2b is capable of communicating with the gateway 7 through a wireless network. The communication management system 9 is connected to the Internet 8d. In this example, the Internet 8d and the LAN 8e are a part of a communications network 8.

The relay device 2a and the access point 6a may be placed in a room X, which could be any room within any building, such as an office floor. The relay device 2a communicates with the communication terminal 4a through a wireless network using a first communications protocol. The access point 6a communicates with the communication terminal 4a through a wireless network using a second communications protocol. The first communications protocol may be, for example, the ZigBee standards communications protocol, and is illustrated as Cp1 in FIG. 1. The second communications protocol may be, for example, Wireless Fidelity (WiFi) standards communications protocol, and is illustrated as Cp2 in FIG. 1. In other words, in this example, the communication terminal 4b communicates with the relay device 2a using the first communications protocol, at least for the first time when the communication terminal 4b is brought into a new location, which differs from the second communications protocol used for communication with the access point 6a.

In this example, the access point 6a, which is placed in the room X, does not change its location as it is fixed to a part of the room X such as to a ceiling of the building. The relay device 2a is implemented by a multifunctional peripheral (MFP) capable of performing a plurality of image processing functions including printing, scanning, copying, and transmitting or receiving facsimile data. While the relay device 2a may be taken outside the room X when relocating the office, or may be moved within the room X when changing layout, the relay device 2a is rarely relocated such that it is most likely to stay at the same location or at least at a location within the room X. The relay device 2a, which is the MFP, is connected to the communications network 8. For example, through the communications network 8, the relay device 2a transmits various information such as counter information indicating a number of printed images to a server. The communication terminal 4a may be implemented by a notebook personal computer (PC), and it may be carried by a user so that the communication terminal 4a can freely change its location as the user carrying the communication terminal 4a moves.

In this example, the relay device 2b, the access point 6b, and the gateway 7 are placed in a room Y, which could be any other room within the building, such as a lounge. The relay device 2b communicates with the communication terminal 4b through the wireless network using the first communications protocol Cp1, such as the ZigBee standards communications protocol. The access point 6b communicates with the communication terminal 4b through the wireless network using the second communications protocol Cp2, such as the WiFi standards communications protocol.

In this example, the relay device 2b is implemented by a light such as a fluorescent light emitting diode (LED). Unless the light needs to be replaced for recharging or due to failure, the light, which is one example of the relay device 2b, stays within the room Y as it is fixed onto a ceiling of the room Y. The relay device 2b incorporates therein a data transmitter/receiver that transmits or receives data using the first communications protocol Cp1, within the LED tube. The communication terminal 4b may be implemented by a smart phone, and it may be carried by the user.

The relay device 2c and the access point 6c may be placed in a room Z, which could by any other room within the building, such as a conference room. The relay device 2c communicates with the communication terminal 4c through the wireless network using the first communications protocol Cp1. The access point 6c communicates with the communication terminal 4c though the wireless network using the second communications protocol Cp2.

In this example, the relay device 2c is implemented by a liquid crystal display television (LCD TV). In such case, the first communications protocol used by the relay device 2c may be, for example, the Intel Wireless Display (WiDi) standards communications protocol. While the relay device 2c may be taken outside the room Z when relocating the office, or may be moved within the room Z to change layout, the relay device 2c is rarely relocated such that it is most likely to stay at the same location or at least at a location within the room Z. The relay device 2c, which is the LCD TV, is connected to the communications network 8. For example, through the communications network 8, the relay device 2c transmits various information such as a user request to a server or receives various information such as an image from the server. The communication terminal 4c may be implemented by a videoconference apparatus, which is capable of displaying an image of a user in the room Z or an image of a user at a counterpart videoconference apparatus, on the LCD TV, using the first communications protocol such as the Intel WiDi communications protocol. In alternative to the LCD TV, any desired display such as an organic electroluminescence (EL) television or a plasma television may be used.

In the following examples, any one or any number of the plurality of relay devices 2a, 2b, and 2c may be collectively or each referred to as the relay device 2. Any one or any number of the plurality of communication terminals 4a, 4b, and 4c may be collectively or each referred to as the communication terminal 4. Any one or any number of the plurality of access points 6a, 6b, and 6c may be collectively or each referred to as the access point 6. As illustrated in FIG. 1, the access point 6 is fixed onto the ceiling of the building, such that, unless the building is renovated, the access point 6 stays at the same location.

Figure 2:
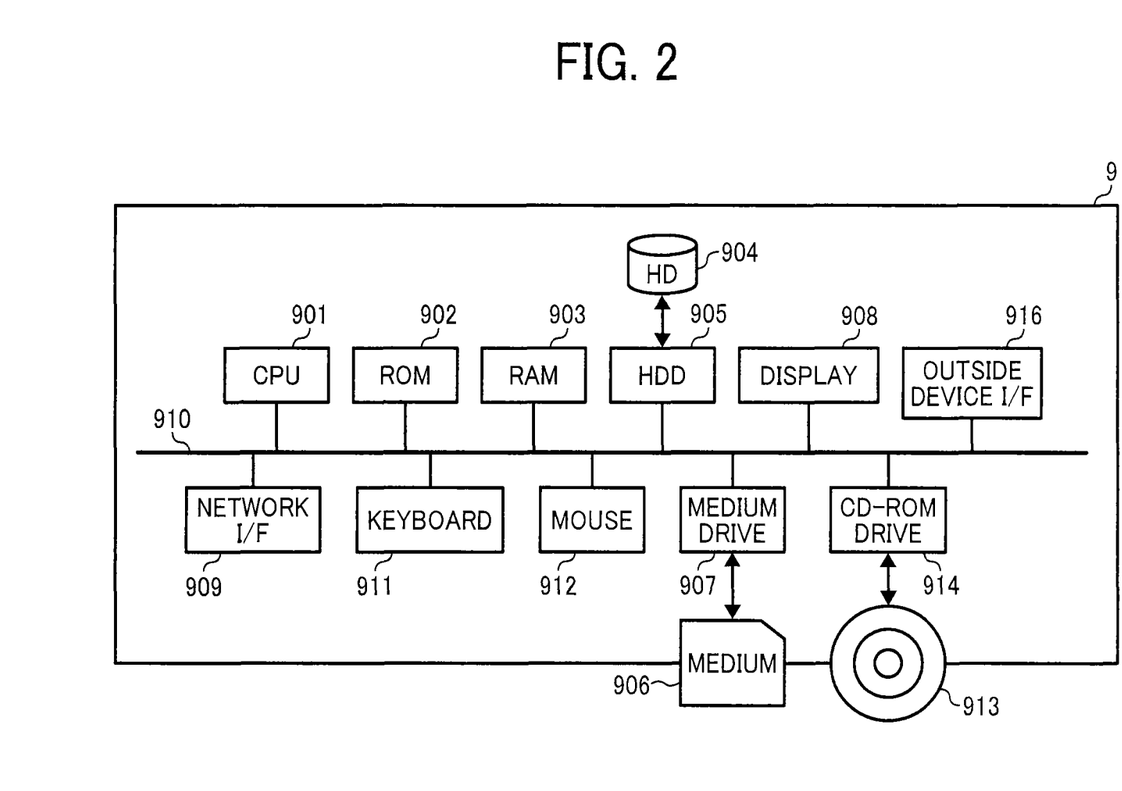
FIG. 2 is schematic block diagram illustrating a hardware structure of a communication management system of the communication system of FIG. 1, according to an example embodiment of the present invention.

Referring now to FIG. 2, a hardware structure of the communication management system 9 is explained according to an example embodiment of the present invention. In this example, the communication management system 9 is implemented by one or more computers, which provide the server function.

The communication management system 9 includes a central processing unit (CPU) 901, a read only memory (ROM) 902, a random access memory (RAM) 903, a hard disk (HD) 904, a hard disk drive (HDD) 905, a medium drive 907, a display 908, a network interface (I/F) 909, a keyboard 911, a mouse 912, a CD-ROM drive 914, and an outside device interface (I/F) 916, which are electrically connected through a bus 910 such as an address bus or a data bus.

The CPU 901 controls entire operation of the communication management system 9. The ROM 902 stores a control program for execution by the CPU 901, such as an initial program loader (IPL). The RAM 903 functions as a work area for the CPU 901. The HD 904 stores therein various data such as the communication management program. The HDD 905 controls reading or writing of various data with respect to the HD 904 under control of the CPU 901. The medium drive 907 controls reading or writing of various data with respect to a removable recording medium 906 such as a flash memory. The display 908 displays various data such as a cursor, menu, window, character, or image. The network I/F 909 allows the communication management system 9 to transmit data through the communications network 8. The keyboard 911 includes a plurality of keys, each of which is used for inputting a user instruction through a character, a numeral, or a symbol. The mouse 912 allows the user to input a user instruction including, for example, selection or execution of a specific instruction, selection of an area to be processed, and instruction of cursor movement. The CD-ROM drive 914 controls reading or writing of various data with respect to a CD-ROM 913. In alternative to the CD-ROM 913, any removable recording medium may be used. The outside device I/F 916 allows the communication management system 9 to connect with any outside apparatus.

As described above, any device could function as the relay device 2, as long as it is capable of communicating with the communication terminal 4 using the first communications protocol, such as near field communication (NFC) standards protocol, ZigBee standards communications protocol, etc. The hardware structure of the relay device 2 thus differs depending on a specific type of device functioning as the relay device 2. Further, as described above, the communication terminal could be any communication apparatus provided with the function of communicating, which is portable. The hardware structure of the communication terminal 4 thus differs depending on a specific type of device functioning as the communication terminal.

Figure 3:
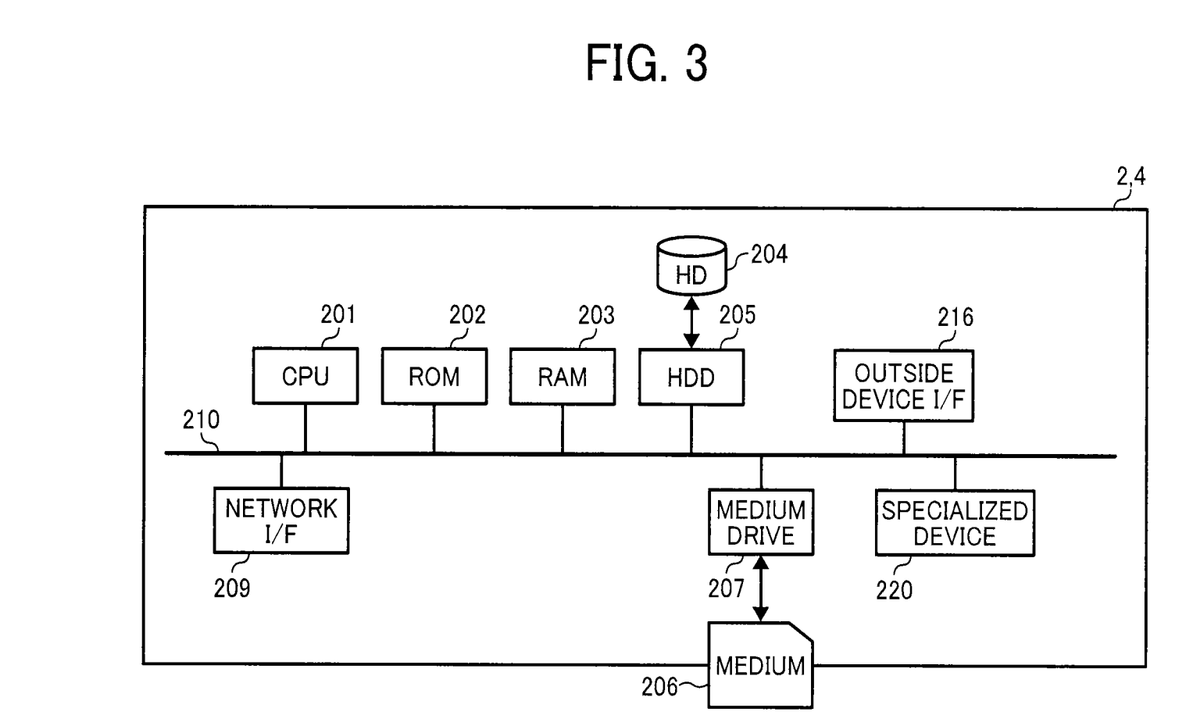
FIG. 3 is a schematic block diagram illustrating a hardware structure of any one of a relay device and a communication terminal of the communication system of FIG. 1, according to an example embodiment of the present invention.

Referring now to FIG. 3, a hardware structure of any one of the relay device 2 and the communication terminal 4, is explained according to an example embodiment of the present invention.

The hardware structure of each one of the relay device 2 and the communication terminal 4 includes a CPU 211, ROM 202, RAM 203, HD 204, HDD 205, a medium drive 207 that controls reading or writing various data with respect to a recording medium 206, a network I/F 209, and an outside device I/F 216, which are connected through a bus line 210. These devices are similar in function and operation to the devices of FIG. 2, such that description thereof is omitted.

The hardware structure of each of the relay device 2 and the communication terminal 4 further includes a specialized device 220, which is electronically connected to the bus line 210.

In case the relay device 2 is implemented by the relay device 2a that is the MFP, the specialized device 220 includes various devices related to image processing to cause the MFP to perform the functions of printing, scanning, copying, and facsimile transmission/reception, under control of the CPU 201.

In case the relay device 2 is implemented by the relay device 2b that is the lamp, the specialized device 220 includes a light such as the LED lamp. More specifically, the relay device 2b implemented by the lamp has a structure substantially similar to that of the general-purpose LED lamp, except that it is provided with a communication device that allows communication with the communication terminal 4.

In case the relay device 2 is implemented by the relay device 2b that is the LCD TV, the specialized device 220 includes devices related to outputting images and sounds. More specifically, the relay device 2c implemented by the LCD TV has a structure substantially similar to that of the general-purpose LCD TV, with the function of communicating.

In case the communication terminal 4 is implemented by the communication terminal 4a that is the notebook PC, the specialized device 220 includes devices related to outputting images or sounds. The specialized device 220 further includes a display that displays an image of an object or various icons such as a liquid crystal display or an organic EL, and a keyboard, which are electrically connected through the bus line 210.

In case the terminal 4 is implemented by the communication terminal 4b that is the smart phone, the specialized device 220 includes devices related to outputting images or sounds, under control of the CPU 201. For example, the specialized device 220 includes a complementary metal oxide semiconductor (CMOS) sensor that captures an image of an object under control of the CPU 201, a sound input that converts sounds to a sound signal such as a microphone, and a sound output that converts the sound signal to sounds such as a speaker. Further, the network I/F 209 may include an antenna, a communication circuit that communicates with a base station using a wireless communication (RF) signal via the antenna, and a GPS receiver that receives a GPS signal from the GPS satellite. The specialized device 220 further includes a display that displays an image of an object or various icons such as a liquid crystal display or an organic EL, and a touch panel, which are electrically connected through the bus line 210.

In case the communication terminal 4 is implemented by the communication terminal 4c that is the videoconference apparatus, the specialized device 220 includes various devices such as a camera, microphone, and speaker.

In one example, the gateway 7 includes a wireless communication circuit and a wired communication circuit. The wireless communicator includes a CPU that controls entire operation of the wireless communicator, a ROM that stores the basic input/output program, a RAM that functions as a work area for the CPU, a communication circuit that transmits data via an antenna, and an I/F that transmits or receives signals with the wired communicator via a connector, which are electrically connected through a bus line such as an address bus or a data bus. The wired communicator includes a CPU that controls entire operation of the wired communicator, a ROM that stores the basic input/output program, a RAM that functions as a work area for the CPU, an Ethernet controller, an I/F that transmits or receives signals with the wireless communicator via the connector, and another I/F that transmits or receives data (signal) with the LAN 8e via a cable, which are electrically connected through a bus line such as an address bus or a data bus. In the wired communicator, the CPU and the Ethernet controller cooperatively operate to convert a communications protocol in compliance with the first communications protocol, to a communication protocol in compliance with wired communication, or vice versa. With this conversion, various data transmitted from the communication terminal 4 can be communicated in the form of a packet based on the Ethernet.

The access point 6 is any device that allows wireless devices, such as the communication terminal 4, to connect to a wired network using the second communications protocol such as wireless LAN communications standards protocol, including the WiFi standards communications protocol. Since any known access point could be used, explanation of its hardware structure is omitted.

Figure 4:
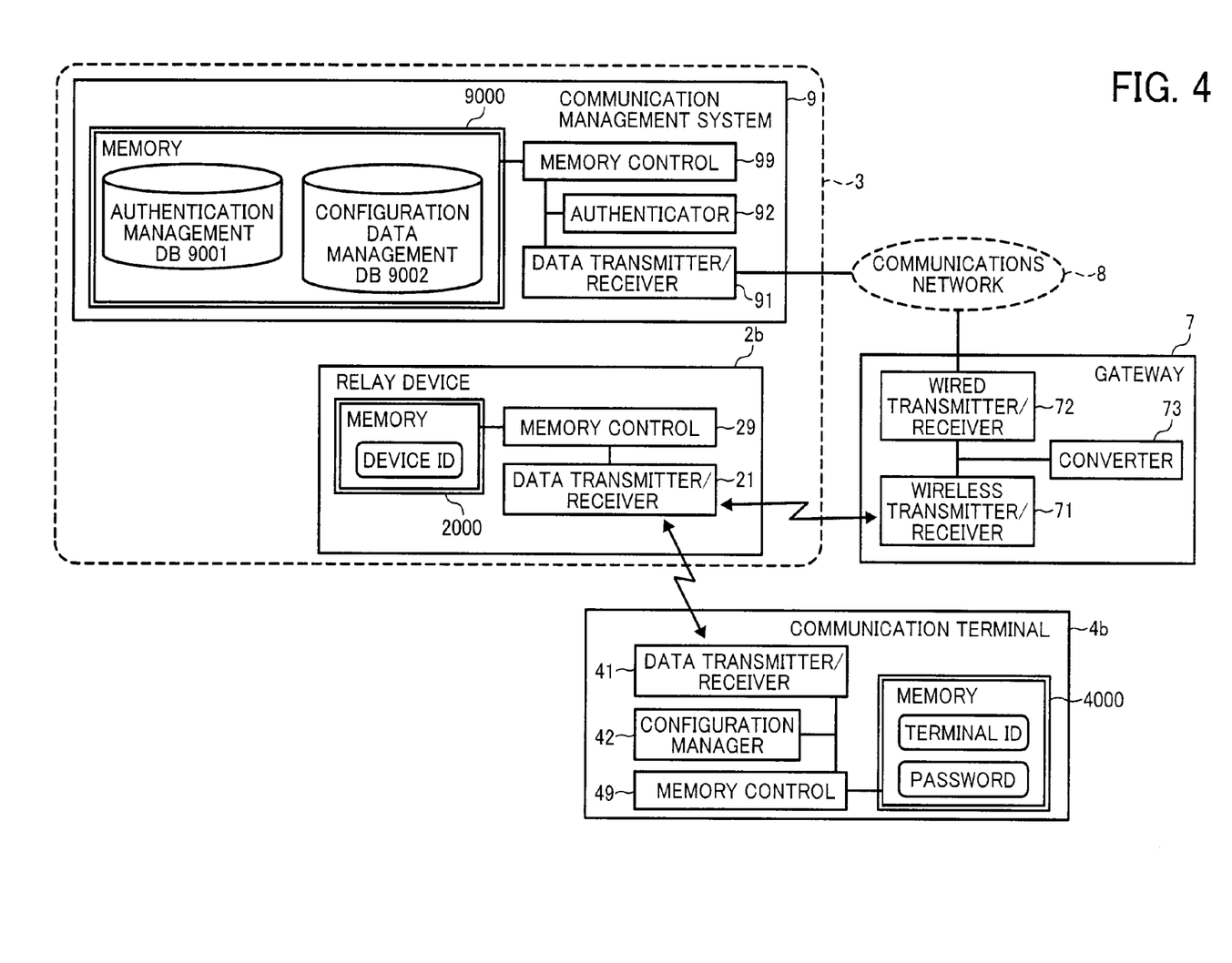
FIG. 4 is a schematic block diagram illustrating a functional structure of the relay device, the communication terminal, a gateway, and the communication management system of the communication system of FIG. 1, according to an example embodiment of the present invention.

Referring now to FIG. 4, a functional structure of a part of the communication system is explained according to an example embodiment of the present invention. More specifically, the relay device 2b, the communication terminal 4b, the gateway 7, and the communication management system 9, which are provided in the lounge Y, are illustrated in FIG. 4. Further, in this example, the relay device 2b and the communication management system 9 together function as a communication control system 3. The communication control system 3 is one example of a communication control system including the relay device 2 and the communication management system 9.

The communication terminal 4a in the room X and the communication terminal 4c in the conference room Z are the same in function to the communication terminal 4b in the lounge Y. The relay device 2a in the room X and the relay device 2c in the conference room Z are the same in function to the relay device 2b and the gateway 7 in the lounge Y. For this reasons, the communication system provided on the lounge Y that is illustrated in FIG. 4 is described as an example, while omitting description of the other communication systems provided on the room X and the conference room Z.

As illustrated in FIG. 4, the relay device 2b includes a memory 2000, which may be implemented by a HD or any desired memory. The memory 2000 stores a device identification (ID) for identifying the relay device 2b.

The relay device 2b further includes a data transmitter/receiver 21 and a memory control 29. The data transmitter/receiver 21, which may be implemented by a communication circuit under control of the instructions of a CPU, transmits or receives various data or information to the communication terminal 4b or the gateway 7 using the first communications protocol. The memory control 29, which may be implemented by the instructions of the CPU, controls reading or writing of various data with respect to the memory 2000.

The communication terminal 4b includes a memory 4000, which may be implemented by a HD, a RAM, or any other desired memory. The memory 4000 stores a terminal ID for identifying the communication terminal 4b, and a password associated with the terminal ID. The terminal ID and the password are used as authentication information that is used to determine whether to authenticate the communication terminal 4b.

The communication terminal 4b further includes a data transmitter/receiver 41, a configuration manager 42, and a memory control 49.

The data transmitter/receiver 41, which may be implemented by the communication circuit under control of the instructions of the CPU, transmits or receives various data or information to the relay device 2b by wireless communication using the first communications protocol.

The configuration manager 42, which may be implemented by the instructions of the CPU, receives configuration data stored in the communication management system 9 via the relay device 2 in response to the request sent in the first communications protocol, and automatically sets with the configuration data to allow the communication terminal 4 to start communication using the second communications protocol.

The memory control 49, which may be implemented by the instructions of the CPU, controls reading or writing of various data with respect to the memory 4000.

The gateway 7 includes a wireless transmitter/receiver 71, a wired transmitter/receiver 72, and a converter 73. The wireless transmitter/receiver 71, which may be implemented by the communication circuit under control of the CPU of the wireless communicator, transmits or receives various data with the relay device 2b by wireless communication using the first communications protocol. The wired transmitter/receiver 72, which may be implemented by the I/F under control of the CPU of the wired communicator, transmits or receives various data with the communication management system 9 by wired communication.

The converter 73, which may be implemented by the Ethernet controller under control of the CPU, converts data received at the wireless transmitter/receiver 71 using the first communications protocol to data that is compatible with the wired transmitter/receiver 72. For example, the ZigBee-based data may be converted to the Ethernet-based data such that a data packet may be communicated using the TCP/IP. Further, the converter 73 converts various data received at the wired transmitter/receiver 72 to data that is compatible with the wireless transmitter/receiver 71 in the first communications protocol.

The communication management system 9 includes a memory 9000, which may be implemented by the HD 904. The memory 9000 includes an authentication management database (DB) 9001 such as an authentication management table, and a configuration data management DB 9002 such as a configuration data management table.

Figure 5:
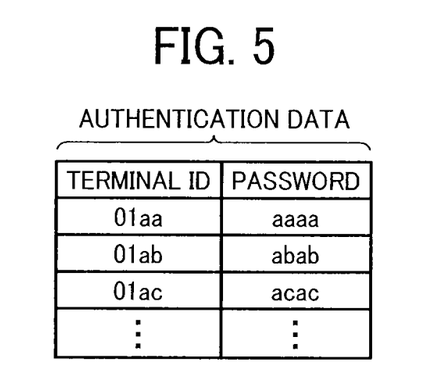
FIG. 5 is an example data structure of an authentication management table, according to an example embodiment of the present invention.

FIG. 5 illustrates an example data structure of the authentication management table, which stores authentication data to be used for authenticating the communication terminal 4. The authentication management table stores, for each one of a plurality of communication terminals 4, the terminal ID for identifying the communication terminal 4 and a password associated with the terminal ID.

Figure 6:
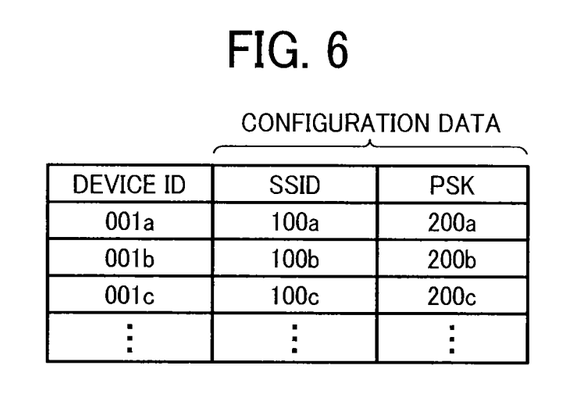
FIG. 6 is an example data structure of a configuration data management table, according to an example embodiment of the present invention.

FIG. 6 illustrates an example data structure of the configuration data management table. The configuration data management table stores, for each one of a plurality of device IDs for identifying the relay device 2, configuration data to be used for communicating with the access point 6 by the communication terminal 4. The configuration data includes a service set identifier (SSID) for identifying the access point 6, and a pre-shared key (PSK) that is an encryption key to be used for encrypting data to be communicated. That is, the device ID of the relay device 2 is associated with the configuration data to be used for accessing the access point 6 provided at a location where the relay device 2 is located. Since the relay device 2 is rarely relocated, information that can identify the relay device 2 may be used to identify the access point 6 or to obtain configuration data regarding the access point 6.

More specifically, assuming that the communication terminal 4 is brought into a location where the relay device 2 is located, the communication terminal 4 obtains the configuration data associated with the device ID of the relay device 2, from the communication management system 9 via the relay device 2. The configuration data allows the communication terminal 4 to communicate with the access point 6 provided at the location where the relay device 2 is provided.

Referring back to FIGS. 2 and 3, a functional structure of the communication management system 9 is explained according to an example embodiment of the present invention. As illustrated in FIG. 4, the communication management system 9 includes a data transmitter/receiver 91, an authenticator 92, and a memory control 99.

The data transmitter/receiver 91, which may be implemented by the network I/F 909 under control of the CPU 901, transmits or receives various data with the gateway 7.

The authenticator 92, which may be implemented by the instructions of the CPU 901, authenticates the communication terminal 4 using authentication data managed by the authentication management DB 9001. The memory control 99, which may be implemented by the instructions of the CPU 901, controls reading or writing of various data with the memory 9000.

Figure 7A:
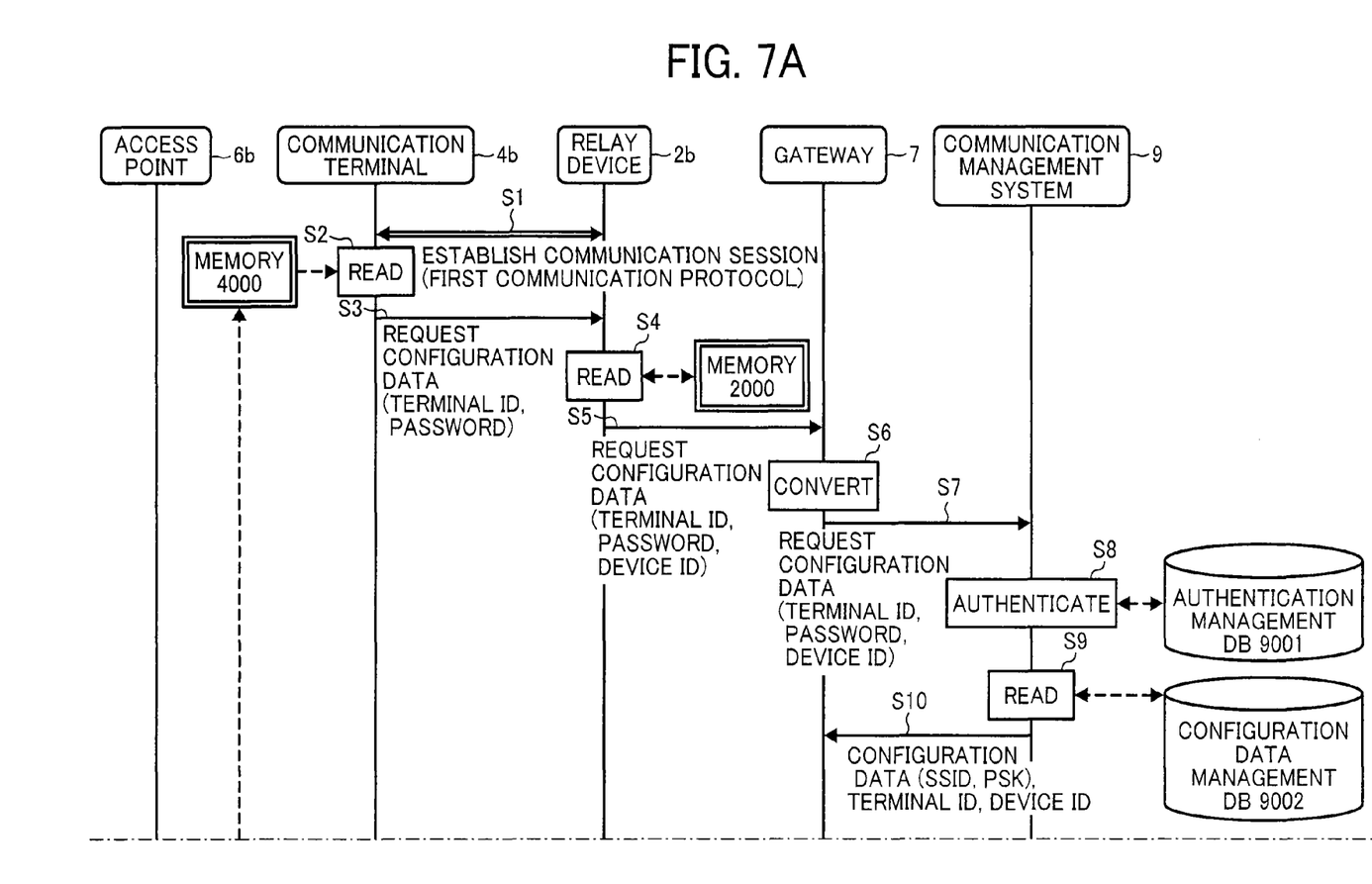
FIGS. 7A and 7B are a data sequence diagram illustrating operation of setting the communication terminal with configuration data used for communication with an access point, performed by the communication system of FIG. 1, according to an example embodiment of the present invention.
Figure 7B:
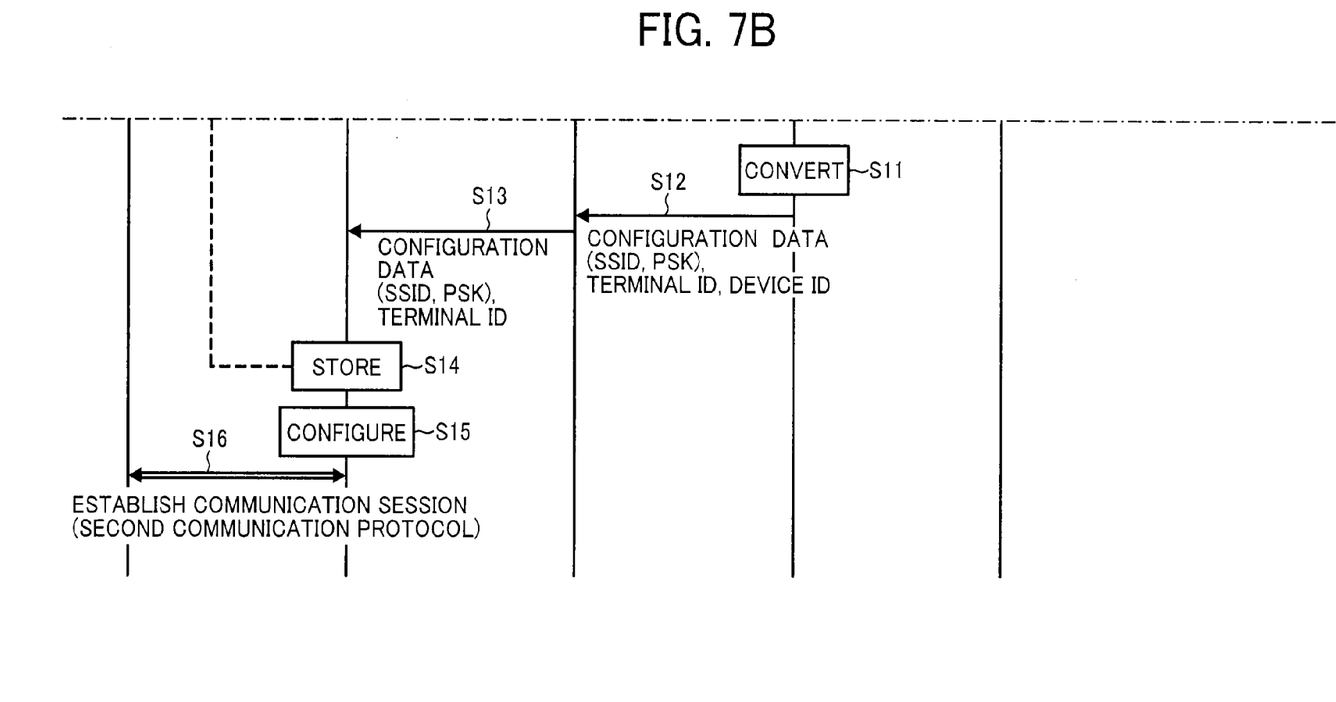

FIGS. 7A and 7B (FIG. 7) illustrate a data sequence diagram illustrating operation of setting the communication terminal with configuration data, such that the communication terminal is capable of communicating with the access point, performed by the communication system of FIG. 4, is explained according to an example embodiment of the present invention. In this example, it is assumed that the communication terminal 4b is set with the configuration data, as the communication terminal 4b is brought in the lounge Y.

At S1, the communication terminal 4b establishes a communication session with the relay device 2b to start communication with the relay device 2b using the first communications protocol, such as the ZigBee standards communications protocol. Any desired known method of establishing a communication session can be used.

At S2, the memory control 49 of the communication terminal 4b reads out the terminal ID and the password of the communication terminal 4b, from the memory 4000. At S3, the data transmitter/receiver 41 transmits a configuration data request to the relay device 2b using the first communications protocol, through the wireless network. The configuration data request includes the terminal ID and the password of the communication terminal 4b, which are read at S2. The relay device 2b receives the configuration data request at the data transmitter/receiver 21.

At S4, the memory control 29 of the relay device 2b reads out the device ID of the relay device 2b from the memory 2000. At S5, the data transmitter/receiver 21 transmits a configuration data request to the gateway 7, using the first communications protocol such as ZigBee standards communications protocol, through a communication session that is previously established with the gateway 7. The configuration data request includes the terminal ID and the password of the communication terminal 4b received at S3, and the device ID of the relay device 2b obtained at S4. The wireless transmitter/receiver 71 of the gateway 7 receives the configuration data request, in the first communications protocol through the wireless network.

At S6, the converter 73 converts the configuration data request that is transmitted by wireless communication, to configuration data request that can be transmitted by wired communication. For example, the converter 73 converts the configuration data request received in the first communications protocol (such as ZigBee), to Ethernet-based configuration data request that can be communicated using the TCP/IP communications protocol. At S7, the wired transmitter/receiver 72 transmits the converted configuration data request, to the communication management system 9 through the communications network 8 in the TCP/IP communications protocol. The data transmitter/receiver 91 of the communication management system 9 receives the configuration data request by wired communication.

At S8, the authenticator 92 of the communication management system 9 authenticates the communication terminal 4b based on determination whether the terminal ID and the password of the configuration data request are registered in the authentication management table of FIG. 5. In this example, it is assumed that the terminal ID and the password are registered in the authentication management table, so that the authenticator 92 determines that the communication terminal 4b is authenticated as a terminal allowed to access.

At S9, the memory control 99 searches the configuration data management table of FIG. 6, using the device ID of the relay device 2b received at S7 as a search key, to obtain the configuration data associated with the device ID of the relay device 2b.

At S10, the data transmitter/receiver 91 transmits the configuration data, and the terminal ID and the device ID that are received at S7, to the gateway 7 through the communications network 8. The wired transmitter/receiver 72 of the gateway 7 receives the configuration data, the terminal ID, and the device ID. In this example, the wired transmitter/receiver 72 receives the terminal ID and the device ID, in addition to the configuration data. With this information, the gateway 7 determines that the data received at S10 is received in response to the configuration data request transmitted at S7.

At S11, the converter 73 converts the data including the configuration data received in the TCP/IP communications protocol, to the data that can be communicated in the first communications protocol. At S12, the wireless transmitter/receiver 71 transmits the converted data including the configuration data, terminal ID, and device ID, to the relay device 2*b* in the first communications protocol such as ZigBee standards communications protocol. The relay device 2*b* receives the configuration data, the terminal ID, and the device ID at the data transmitter/receiver 21. The data transmitter/receiver 21 receives the terminal ID and the device ID in addition to the configuration data, such that the relay device 2*b* determines that the configuration data received at S12 is transmitted in response to the configuration data request transmitted at S5.

At S13, the data transmitter/receiver 21 of the relay device 2*b* transmits the configuration data and the terminal ID, to the communication terminal 4*b* that transmits the configuration data request at S3, in the first communications protocol. The communication terminal 4*b* receives the configuration data and the terminal ID at the data transmitter/receiver 41. The data transmitter/receiver 41 receives the terminal ID in addition to the configuration data, such that the communication terminal 4*b* determines that the data received at S13 is transmitted in response to the configuration data request transmitted at S3.

At S14, the memory control 49 of the communication terminal 4*b* stores the configuration data received at S13 in the memory 4000. At S15, the configuration manager 42 automatically sets with the configuration data, which is used for wireless communication with the access point 6*b* using the second communications protocol. At S16, the data transmitter/receiver 41 establishes a communication session with the access point 6*b*, so that the communication terminal 4*b* can start communication using the second communications protocol such as WiFi standards communications protocol.

As described above, in one example embodiment, the communication management system 9 associates a device ID for identifying the relay device 2, and configuration data used for communication with the access point 6. More specifically, the communication management system 9 manages the device ID for identifying the relay device 2 that receives a configuration data request from the communication terminal 4 in the first communications protocol, and configuration data to be used for configuring communication by the communication terminal 4 with the access point 6 in the second communications protocol, in association with each other. When the communication terminal 4 requests for configuration data to the communication management system 9, via the relay device 2 placed in the same room where the communication terminal 4 is provided, the communication management system 9 sends the configuration data that corresponds to a device ID of the relay device 2, to the communication terminal 4.

With this configuration, the communication terminal 4 is able to obtain the configuration data to be used for communicating with the access point 6 in that room. Since a user does not have to manually set configuration data for the communication terminal 4, workloads otherwise required for obtaining and manually setting the configuration data can be reduced.

For example, as illustrated in FIG. 1, the user may carry the communication terminal 4, such as the videoconference apparatus, from room to room, or from building to building. After the communication terminal 4 is relocated, a user needs to set the communication terminal 4 with configuration data that allows communication, such as wireless communication, with an access point that is set for that location. It has been cumbersome for the user to obtain and manually set with the configuration data.

In the above-described example embodiment, the access point 6, which is fixed onto the ceiling, is rarely moved. The relay device 2, which is located in the same room where the access point 6 is located, is rarely moved. Even when the communication management system 9 receives a request for configuration data from the relay device 2, which is a separate device from the access point 6 but capable of communicating with the communication terminal 4, the communication management system 9 is able to send configuration data via the relay device 2 to the communication terminal 4 that is just brought into the room where the relay device 2 is located.

If the installation location of the access point 6 or the relay device 2 changes, a user, such as an administrator of the communication management system 9, can simply modify the contents in the configuration data management DB 9002. However, since the access point 6 and the relay device 2 are rarely moved, the user does not need to constantly update the configuration data in the configuration data management DB 9002.

While the above-described example illustrates the example case for the communication network in the lounge Y, the other communication network in the room X or the room Z may operates in a substantially similar manner. In such case, the relay devices 6*a* and 6*c* each perform operation performed by the relay device 2*b* and the gateway 7.

Further, any desired number of relay devices 2 may be provided in one room. In such case, the communication terminal 4 only needs to send the configuration data request to one of the relay devices 2, which transmit such request to the communication management system 9 through the gateway 7 by multi-hop communication.

The communication management system 9 may be implemented by a single computer. Alternatively, any number of parts, such as functions, modules, or storage areas, of the communication management system 9 may be classified into a desired number of groups to be carried out by a plurality of computers.

A recording medium storing any one of the communication management program, the relay control program, and the terminal control program, or a storage device such as the HDD that stores any one of the communication management program, the relay control program, and the terminal control program may be distributed within the country or to another country as a computer program product.

The terminal ID is one example of terminal identification information for identifying the communication terminal 4. In alternative to the terminal ID, a manufacturing number of the communication terminal 4 may be used. The device ID is one example of device identification information for identifying the relay device 2. In alternative to the device ID, a manufacturing number of the relay device 2 may be used.

In the above-described example embodiment, the communication terminal 4 is implemented by a notebook PC, smart phone, or videoconference apparatus. Other examples of the communication terminal 4 include, but not limited to, a tablet PC, projector, watch, camera, game machine, wheelchair, and medical equipment such as an endoscope.

In the above-described example embodiment, the relay device 2 is implemented by a MFP, florescent LED lighting device, or LCD, but any other device capable of communicating with the communication management system 9 through the communications network may be used. In particular, the relay device 2 is a device that is rarely relocated, for example, by fixing onto the ceiling of the room. Other examples of the relay device 2 include, but not limited to, a fan, speaker, emergency lamp, fire detector, smoke detector, monitoring camera, and air conditioner.

In the above-described example embodiment, the first communications protocol includes ZigBee standards or Intel WiDi standards communications protocol. Other examples of the first communications protocol include, but not limited to, Bluetooth standards or Near Field Communication (NFC) standards communications protocol. While ZigBee standards is based on a physical layer and a MAC layer of the IEEE802.15.4 standard architecture model, in one example, ZigBee-based standards communications protocol may be used with at least the physical layer of the IEEE802.15.4 standard architecture model.

In the above-described example embodiment, the second communications protocol includes WiFi standards communication protocol. Other examples of the second communications protocol include, but not limited to, 3rd Generation (3G), Worldwide Interoperability for Microwave Access (WiMAX), Long Term Evolution (LTE), and NFC. In such case, the communication terminal 4 communicates with a base station on wireless communications network, in alternative to the access point 6.

In FIG. 1, the MFP functioning as the relay device 2a is located in the room X, the florescent LED lighting device functioning as the relay device 2b and the gateway 7 are located in the lounge Y, and the LCD TV functioning as the relay device 2c is located in the conference room Z. Alternatively, any room may be provided with any type of relay device 2.

Moreover, in FIG. 1, the notebook PC functioning as the communication terminal 4a is located in the room X, the smart phone functioning as the communication terminal 4b is located in the lounge Y, and the videoconference apparatus functioning as the communication terminal 4c is located in the conference room Z. Alternatively, any room may be provided with any type of communication terminal 4.

In the above-described example embodiment, WiFi wireless communications protocol is used as the second communications protocol. Alternatively, the second communications protocol may be wired communications protocol, or a combination of wired and wireless communications protocol. In case where both wired and wireless communications protocols are to be used, wired communication may be used in priority to wireless communication.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program. Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc. Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In one example, the present invention may reside in a relaying method performed by a relay device, including: storing, in a memory, relay device identification for identifying the relay device; transmitting the relay device identification information obtained from the memory to a communication management system using a first communications protocol, in response to a configuration data request received from a communication terminal using the first communications protocol; receiving configuration data associated with the relay device identification information from the communication management system; and transmitting the configuration data received from the communication management system to the communication terminal as a response to the configuration data request using the first communications protocol, the configuration data allowing the communication terminal to communicate using a second communications protocol.

In one example, the present invention may reside in a recording medium storing a plurality of instructions which, when executed by a processor, cause the processor to perform any one of the above-described methods.

What is claimed is:

1. A relay device configured to communicate with a communication management system through a network, the relay device comprising:
 a memory that stores relay device identification information identifying the relay device;
 a transmitter that transmits the relay device identification information obtained from the memory to the communication management system using a first communications protocol, in response to a configuration data request received from a communication terminal using the first communications protocol; and a receiver that receives configuration data associated with the relay device identification information from the communication management system, wherein the transmitter further transmits the configuration data received from the communication management system to the communication terminal as a response to the configuration data request using the first communications protocol, the configuration data allowing the communication terminal to communicate using a second communications protocol.

2. The relay device of claim 1, wherein, when the configuration data request is transmitted with authentication information to be used for authenticating the communication terminal that sends the configuration data request, the transmitter transmits the authentication information of the communication terminal to the communication management system in addition to the relay device identification information, and the transmitter transmits the configuration data received from the communication management system to the communication terminal, when the communication management system determines that the communication terminal is authenticated.

3. The relay device of claim 2, wherein the authentication information includes identification information identifying the communication terminal that transmits the configuration data request.

4. The relay device of claim 1, wherein the first communications protocol is one of ZigBee, Bluetooth, NFC, and Intel WiDi.

5. The relay device of claim 4, wherein the second communications protocol is one of WiFi, 3G, WiMAX, LTE, and NFC.

6. The relay device of claim 1, wherein the receiver receives the configuration data, which includes:

counterpart apparatus identification data that identifies a counterpart apparatus with which the communication terminal communicates using the second communications protocol; and encryption key data to be used for encrypting communication using the second communications protocol.

7. The relay device of claim 6, wherein the relay device is provided in a location sufficiently close to a location at which the counterpart apparatus is provided.

8. A system, comprising:
the relay device of claim 1; and
the communication terminal configured to operate with the configuration data received from the communication management system to start communication with a counterpart apparatus using the second communications protocol.

9. The system of claim 8, further comprising:
the communication management system including a memory that stores, for each one of one or more relay devices, device identification information identifying a relay device capable of communicating with a communication terminal using the first communications protocol, in association with the configuration data that allows the communication terminal to communicate using the second communications protocol,
wherein the configuration data associated with the relay device identification information of the relay device is obtained from the memory using the relay device identification information transmitted from the relay device.

10. A communication management system, comprising:
a memory that stores, for each one of one or more relay devices, relay device identification information identifying a relay device capable of communicating with a communication terminal using a first communications protocol, in association with configuration data that allows the communication terminal to communicate using a second communications protocol;

a receiver that receives relay device identification information identifying a relay device, the relay device identification information being transmitted from the relay device that receives a configuration data request from a communication terminal using the first communications protocol; and a transmitter that transmits configuration data associated with the relay device identification information obtained from the memory, to the communication terminal via the relay device.

11. The communication management system of claim 10, wherein the memory is further configured to store authentication information to be used for authenticating the communication terminal, the system further comprising:

a processor that determines whether the communication terminal is authenticated using the stored authentication information, when the receiver receives authentication information from the communication terminal, wherein, when the authentication information of the communication terminal matches the stored authentication information, the processor determines that the communication terminal is authenticated, and transmits the configuration data to the relay device to cause the relay device to transmit the configuration data to the communication terminal.

12. The communication management system of claim 11, wherein the authentication information includes terminal identification information that identifies the communication terminal.

13. The communication management system of claim 10, wherein the first communications protocol is one of ZigBee, Bluetooth, NFC, and Intel WiDi.

14. The communication management system of claim 13, wherein the second communications protocol is one of WiFi, 3G, WiMAX, LTE, and NFC.

15. The communication management system of claim 10, wherein the transmitter transmits the configuration data, which includes:

counterpart apparatus identification data that identifies a counterpart apparatus with which the communication terminal communicates using the second communications protocol; and encryption key data to be used for encrypting communication using the second communications protocol.

16. A communication control system, comprising:
the communication management system of claim 10; and
the relay device configured to communicate with the communication management system through a network,
wherein the relay device transmits the relay device identification information identifying the relay device to the communication management system, in response to the configuration data request received from the communication terminal, and transmits the configuration data received from the communication management system to the communication terminal.

17. A communication method, comprising:
- storing, in a memory, for each one of one or more relay devices, device identification information identifying a relay device capable of communicating with a communication terminal using a first communications protocol, in association with configuration data that allows the communication terminal to communicate using a second communications protocol;
- receiving, from a relay device that receives a configuration data request from a communication terminal using a first communications protocol, relay device identification information identifying the relay device; and
- transmitting configuration data associated with the relay device identification information obtained from the memory, to the communication terminal via the relay device.

18. The communication method of claim 17, further comprising:
- storing authentication information to be used for authenticating the communication terminal; and
- determining whether the communication terminal is authenticated using the stored authentication information, when authentication information is received from the communication terminal,
- wherein, when the determining determines that the communication terminal is authenticated based on a match between the authentication information of the communication terminal and the stored authentication information, the transmitting transmits the configuration data to the relay device to cause the relay device to transmit the configuration data to the communication terminal.

19. The communication method of claim 17, further comprising:
- storing counterpart apparatus identification data that identifies a counterpart apparatus with which the communication terminal communicates using the second communications protocol, and encryption key data to be used for encrypting communication using the second communications protocol, as the configuration data associated with the device identification information.

* * * * *